United States Patent Office 3,340,221
Patented Sept. 5, 1967

3,340,221
POLYMERS CONTAINING ETHYLENICALLY UNSATURATED DERIVATIVES OF ORTHO-HYDROXY AROMATICS AS REACTIVE DYE SITES
Albert I. Goldberg, Berkeley Heights, N.J., and Martin Skoultchi and Joseph Fertig, New York, N.Y., assignors to National Starch and Chemical Corporation, New York, N.Y., a corporation of Delaware
No Drawing. Filed Dec. 12, 1962, Ser. No. 243,983
The portion of the term of the patent subsequent to Apr. 27, 1982, has been disclaimed
10 Claims. (Cl. 260—41)

ABSTRACT OF THE DISCLOSURE

A process for the coloration of polymers and the colored polymers thus obtained, the polymers employed in said process being derived from at least one ethylenically unsaturated monomer and at least about 0.1%, by weight, of an ethylenically unsaturated derivative of an ortho-hydroxy aromatic compound which corresponds to the formula:

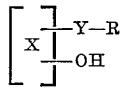

wherein Y is a radical selected from the group consisting of oxy and carboxy radicals;
wherein X is a radical of the benzene series selected from the group consisting of phenyl and naphthyl radicals having said —OH and —Y—R groups substituted thereon in positions which are ortho with respect to one another; and
wherein R is an ethylenically unsaturated radical selected from the group consisting of beta-hydroxypropyl acrylate and beta-hydroxypropyl methacrylate radicals; said method comprising reacting said polymer with at least one diazonium salt.

---

This invention relates to a novel method for the coloration of polymers as well as to the colored polymeric compositions thereby prepared. More particularly, this invention relates to a method for the coloration of polymers containing a certain class of comonomers, said method providing such polymers with an unextractable, "built-in" color which is uniformly distributed throughout the polymer molecule.

Present methods for coloring polymers involve their formulation with either oil soluble dyes or with solid, inert pigments which are dispersed in the polymer. These methods present few difficulties when applied to low melting, amorphous plastics such, for example, as polymethylmethacrylate or polyethylene. However, these extraneous additives are quite often inoperable when attempts are made to color high melting, crystalline polymers, such as isotactic polypropylene or polyacrylonitrile, which are, of course, the type of polymer which is ordinarily utilized for the preparation of synthetic fibers. Thus, in order to render such polymers dyeable, it has been necessary to have them chemically and/or physically modified, subsequent to their polymerization, whereupon a very specific dye must then be used in order to color each different polymer type.

Still another approach to the problem of coloring synthetic polymers is offered in U.S. Patent No. 3,011,860, which discloses the preparation of vinyl polymers containing naphthol dye coupling components as chain terminators. These polymers are subsequently colored by means of a reaction with diazonium salts. Although this technique offers some improvement over the above described coloring methods, it nonetheless suffers from a number of serious limitations. Thus, incorporation of reactive dye sites into a polymer by means of a chain transfer reaction is generally found to be a random, inefficient technique which lowers the molecular weight of the resulting polymer and results, at best, in the attachment of only one reactive site at one end of the polymer molecule. As a result, the concentration of dye sites which can, in effect, be incorporated in the polymer molecule is seriously limited. In addition, some naphthol dye coupling components may also function as inhibitors to the polymerization of a number of vinyl monomers.

It is the object of this invention to provide a method for the coloration of polymers containing a certain class of monomers. Another object of this invention involves providing a method for the coloration of polymers which results in said polymers having a high intensity of color which is an integral or "built-in" part of the polymer and which is, moreover, uniformly distributed throughout the polymer molecule. Various other objects and advantages of this invention will become apparent from the following description thereof.

In our copending application, Ser. No. 228,021, filed Oct. 3, 1962, and assigned to the assignee of the subject application, there is disclosed the preparation of a wide variety of homo- and copolymers containing at least one ethylenically unsaturated derivative of an ortho-hydroxy aromatic compound which corresponds to the formula:

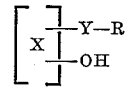

wherein Y is a radical selected from among the group consisting of the oxy, i.e. —O—, and carboxy, i.e.

radicals; wherein X is a radical of the benzene series selected from among the group consisting of phenyl and naphthyl radicals having said —OH and —Y—R groups substituted thereon in positions which are ortho with respect to one another; and, wherein R is an ethylenically unsaturated radical selected from among the group consisting of beta-hydroxypropyl acrylate, i.e.

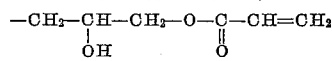

and beta-hydroxypropyl methacrylate, i.e.

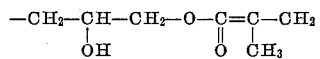

radicals.

The following list is representative of the above described monomers. For purposes of brevity, this list notes only the beta-hydroxypropyl acrylate derivatives; however, it is of course to be understood that the corresponding beta-hydroxypropyl methacrylate derivatives may also be utilized where so desired. One may thus list:

2-hydroxy-3-(2-hydroxy-benzoyloxy)propyl acrylate;
2-hydroxy-3-(1-hydroxy-2-naphthoyloxy)propyl acrylate;
2-hydroxy-3-(2-hydroxy-3-naphthoyloxy)propyl acrylate;
2-hydroxy-3-(2-hydroxy-1-naphthoyloxy)propyl acrylate;
2-hydroxy-3-3(2-hydroxyphenoxy)propyl acrylate;
2-hydroxy-3-(1-hydroxy-2-naphthoxy)propyl acrylate; and,
2-hydroxy-3-(2-hydroxy-3-naphthoxy)propyl acrylate.

Thus, it is to be seen that the monomers which are essential for the preparation of these polymeric compositions may be described as ethylenically unsaturated derivatives of ortho-hydroxy aromatic compounds which are prepared by the reaction of the latter with either glycidyl acrylate or glycidyl methacrylate. More specifically they are the beta-hydroxypropyl acrylate and methacrylate esters of ortho-hydroxy aromatic acids and the beta-hydroxypropyl acrylate and methacrylate ethers of ortho-dihydric phenols. Details relating to the preparation of these monomers may be obtained in our copending applications, Ser. Nos. 219,112 and 219,119, both filed Aug. 24, 1962 and assigned to the assignee of the subject application. Hereinafter, these monomers will, for purposes of brevity, be referred to as "the dye site monomers."

We have now discovered that the homo- and copolymers derived from these ethylenically unsaturated ortho-hydroxy aromatic dye site monomers may be reacted with diazonium salts so as to thereby provide these polymers with an integral or "built-in" color which is uniformly distributed throughout the polymer molecule. Furthermore, the novel process of our invention does not place any limitation as to the comonomers which may be included in the polymers applicable for coloration thereby.

The novel colored polymeric compositions prepared by means of the process of our invention may be described as polymers containing at least one mer, i.e. a repetitive chemical structural unit, corresponding to the following formula:

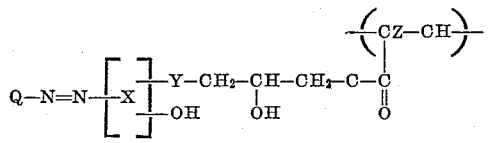

wherein Z is a radical selected from among the group consisting of hydrogen and methyl radicals; wherein Y is a radical selected from among the group consisting of the oxy, i.e. —O—, and carboxy, i.e.

radicals; wherein Q is a radical of the benzene series selected from among the group consisting of the phenyl, naphthyl, and anthracyl radicals; wherein X is a radical of the benzene series selected from among the group consisting of phenyl and naphthyl radicals having said —OH and

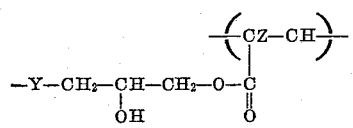

groups substituted thereon in positions which are ortho with respect to one another. In the case of homopolymers which are entirely derived from the above described dye site monomers, these mers will constitute the entire polymer molecule. On the other hand, in the case of copolymers derived from one or more ethylenically unsaturated comonomers in addition to one or more of the dye site monomers, these mers will be homogeneously distributed throughout the entire polymer molecule along with the mers derived from the ethylenically unsaturated comonomers.

Among the various comonomers which may be utilized together with the above described ethylenically unsaturated derivatives of ortho-hydroxy aromatic compounds which serve as the dye site monomers for the colored polymeric compositions of our invention, one may include any ethylenically unsaturated, i.e. vinyl type, monomer such, for example, as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; isoprene; butadiene; methacrylic acid; acrylamide; acrylonitrile; methacrylonitrile; vinyl propionate; dibutyl maleate; dibutyl fumarate; vinylidene chloride; vinyl chloride; vinyl acetate; ethylene; and, propylene, etc. Any of these monomers may be used either alone or in combination with one another together with one or more of the dye site monomers.

In order to provide copolymers which will contain adequate reactive sites for subsequent reaction with diazonium salts, it is necessary that the copolymer contain at least about 0.1%, by weight, of these dye site monomers. As for their maximum concentration, this will of course depend upon the particular comonomers with which these dye site monomers are to be polymerized as well as on the specific end use application of the resulting polymer. However, in most cases, a concentration of about 20%, by weight, will be fully adequate with economically useful results being obtained with a concentration in the range of about 2 to 5%. It may be noted that by varying the concentration of these dye site monomers, it is possible to vary the intensity or shading of the color which is achieved upon reaction of the dye site containing polymer with the diazonium salt. Thus, with any given diazonium salt, the intensity of color which is produced will be directly proportional to the concentration of dye site monomer which is present within the polymer.

As for the actual preparation of the dye site containing homo- and copolymers which may be colored by means of the process of our invention, there may be employed any of the usual vinyl polymerization methods which are well known to those skilled in the art and which is particularly suited for the polymer whose preparation is desired. Thus, they may be prepared by means of free radical initiated processes utilizing bulk, suspension, solution, or emulsion polymerization techniques; or, they may be prepared by ionic catalysis or by means of stereospecific catalysts such as those of the type developed by Ziegler.

In any event, these homo- and copolymers derived from the dye site monomers, whether prepared by means of bulk, suspension, solution or emulsion polymerization techniques, or by other means, are all characterized by their ability to provide reactive sites for subsequent reactions with diazonium salts, by means of the process of our invention, so as to thereby convert these polymers into integrally colored compositions.

In conducting this reaction between the diazonium salts and the homo- or copolymers containing the above described dye site monomers, the latter polymers may be in either lacquer or aqueous systems. Thus they may be dissolved in organic solvents or either dissolved or emulsified in water. We find, however, that optimum results are achieved by the use of polymer solution systems utilizing a polar solvent which is at least partially miscible with water. Such solvents include: isopropanol, acetone, butanol, ethanol, methanol, dioxane, dimethylformamide, dimethylsulfoxide, and tetrahydrofuran.

The diazonium salts which may be utilized in the preparation of our colored polymeric compositions are readily synthesized by means of reactions well known to those skilled in the art which do not, of course, comprise a novel aspect of the process of our invention. These diazonium salts may be represented by the following formula:

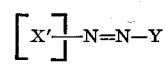

wherein X' is a radical of the benzene series selected from among the group consisting of the phenyl, naphthyl, and anthracyl radicals and wherein Y is an anion selected from among the group consisting of formate, chloride, bromide, and sulfate radicals. In brief, the diazonium salts are ordinarily prepared by the addition of sodium nitrite to an aqueous solution of an aromatic amine which is cooled to a temperature of about 0 to 5° C. and which also contains an excess of hydrochloric acid. This reaction thereby yields an aqueous solution of the diazonium salt. It should be noted that although hydrochloric acid is usually employed in this process, other strong acids such as formic, hydrobromic, and sulfuric acids may also be used if so desired.

The color which is produced upon the reaction of these diazonium salts with the polymers derived from the dye site monomers is dependent upon the particular aromatic amine which has been utilized in preparing the diazonium salt as well as on the particular dye site monomer which has been used in the preparation of the polymer whose coloration is being effected. However, the shading or intensity of this particular color will, as noted earlier, be dependent upon the concentration of the dye site monomer in the polymer as well as on the diazonium salt which is chosen for the reaction. The following table, which it should be noted is only a partial listing, indicates a number of the applicable aromatic amines which may be used to prepare diazonium salts that may, in turn, be utilized in the process of our invention.

| | |
|---|---|
| o-chloroaniline | 5-chloro-2-aminotoluene |
| dianisidine | p-nitro-o-anisidine |
| 2,5-dichloroaniline | 4-nitro-2-aminotoluene |
| 2-nitro-5-chloroaniline | p-nitroaniline |
| 1-aminoanthraquinone | 2-methoxy-4-nitroaniline |
| 4-nitro-2-methoxyaniline | 2-nitro-4-methylaniline |
| o-nitroaniline | m-chloroaniline |
| o-nitro-p-toluidine | m-nitroaniline |

In the process of our invention, the diazonium salts may be used in situ in the form of the aqueous solution in which they are initially prepared; or, more preferably, they may be utilized in the more convenient form of a dry solid provided that they are first converted into their so-called "stabilized" form by treatment of their aqueous solutions with such reagents as zinc chloride; sodium fluoborate; naphthalene-1, 5-disulfonic acid; or sulfuric acid. It should again be noted that the preparation of these stabilized diazonium salts involve processes well known to those skilled in the art which are not, of course, being claimed as a novel aspect of the process of our invention.

The actual reaction between diazonium salts and the dye site containing polymers applicable to the coloration process of our invention is readily accomplished by simply admixing solutions of the reactants and thereupon heating the resulting mixture to a temperature in the range of about 20 to 100° C., preferably under reflux conditions, with the heating being continued until the polymer has attained its maximum degree of coloration. As an alternative, one may eliminate the heating of the reaction mixture provided that the pH of the polymer system has previously been adjusted to a level in the range of from about 5 to 9 by the addition, thereto, of any alkaline material such as sodium or potassium hydroxide or, more preferably, ammonia which is introduced as an aqueous solution. Under these conditions, the coloration of the polymer is almost instantaneous, whereas when the normally acidic polymer system is heated without any prior adjustment of its pH, the color change will be more gradual since the attainment of full color development is accelerated by heating.

When stabilized diazonium salts are employed, they are first usually dissolved in a polar solvent which is at least partially miscible with water. Examples of such solvents are to be found in the list given earlier in this specification. By predissolving the stabilized diazonium salts in this manner, the reaction proceeds far more uniformly without the possibility of any localized reactions, or of any incomplete utilization of the diazonium salts, as might occur if the stabilized salt were introduced, as a solid, directly into the polymer system.

With respect to proportions, the diazonium salts should preferably be utilized in a concentration which is stoichiometrically equivalent to the mole percent of the dye site monomer which is present within the polymer whose coloration is desired.

A number of variations are possible within the scope of the polymer coloration process of our invention. For example, the polymer, if in the form of an organic solvent solution, may be diluted with a polar solvent solution of the stabilized diazonium salt; or, in the case of an aqueous polymer system, the dilution is effected with an aqueous solution of either an unmodified or of a stabilized diazonium salt. Fibers may be spun or films may then be cast from the resulting mixtures which, after being dried, are then readily colored by being exposed to the vapors of an alkaline material such as ammonia or of any of the various volatile organic amines such as triethyl amine or tributyl amine. Alternatively, such fibers and films which have been derived from polymer systems admixed with diazonium salts may be colored by being immersed in an aqueous solution of any water soluble alkaline material such as sodium hydroxide. With either of the above described techniques, the concentration of the diazonium salt which is admixed with the polymer system should again be stoichiometrically equivalent to the mole percent of the dye site monomer which is present within the polymer undergoing reaction.

In still another variation of our process fibers may be spun or films may be cast from either aqueous or organic solvent systems of the polymers applicable for coloration. After being dried, these fibers or films may then be immersed in an aqueous solution of either an unmodified or of a stabilized diazonium salt. The immersed fiber or film should then be heated, at a temperature in the range of about 20 to 100° C., until the coloration reaction has proceeded to completion and the polymer has attained its maximum color intensity. For example, when heated on a steam bath, a period of about 30 minutes will usually be more than adequate. In this particular process modification, the diazonium salt should be present in a concentration which is in a stoichiometric excess with respect to the mole percent of the dye site monomer which is present within the polymer whose coloration is being effected.

It may also be noted that it is possible, if so desired, to employ a mixture of two or more diazonium salts in conducting the process of our invention. In this manner, one may succeed in producing polymeric compositions having a color which is intermediate between that which results from the use of the individual diazonium salts comprising the selected mixture.

Our novel colored polymeric compositions may be utilized in a wide variety of applications corresponding to the same uses wherein the comparable polymers, i.e. those polymers devoid of dye site monomers, are presently employed. Thus, fibers may be spun or films and coatings may be cast from their solutions onto any desired substrate including paper, wood, metals, leather, and the various synthetic plastic films such as those derived from polyvinyl chloride, polyethylene and polypropylene. In addition, our colored polymeric compositions may also be used for the preparation of molded objects.

The following examples will further illustrate the embodiment of our invention. In these examples, all parts given are by weight unless otherwise noted.

*Example I*

This example illustrates the preparation of several colored polymeric compositions by means of the novel process of our invention.

An 83:15:2 ethyl acrylate:acrylic acid:2-hydroxyl-3-(2-hydroxy-3-naphthoyloxy)propyl acrylate terpolymer lacquer, in a 45:55 isopropanol:water solution, was prepared by charging the following ingredients into a reactor equipped with a reflux condenser as well as with means for mechanical agitation.

| | |
|---|---|
| Ethyl acrylate | 83.0 |
| Acrylic acid | 15.0 |
| 2-hydroxyl-3-(2-hydroxy-3-naphthoyloxy)propyl acrylate | 2.0 |
| Benzoyl peroxide | 1.0 |
| Isopropanol:water solution, 45:55 | 150.0 |

Under agitation, the above mixture was then refluxed at 78° C. for a period of 6 hours whereupon it was allowed to cool and discharged from the reactor. The resulting lacquer had a resin solids content of 40%, by weight. The pH of this lacquer was then adjusted to a value of 6.5–7.0 by the addition of aqueous ammonia.

A number of samples, each containing 10 parts of the thus prepared polymer lacquer, were each respectively admixed with 10 parts of a 1:1 acetone:water solution containing the stoichiometric amount, with respect to the concentration of the dye site monomer in the polymer, of a stabilized diazonium salt. Below are listed the various stabilized diazonium salts and the amounts of each which were utilized along with the color produced by means of the resulting reaction. Also listed are the various colors which were obtained with a series of control samples which were identical in all respects to the above described polymer samples with the exception, in each case, that they had been obtained from a polymer which had been polymerized without the inclusion therein of the dye site monomer, i.e. the 2-hydroxy-3-(2-hydroxy-3-naphthoyloxy)propyl acrylate, whose presence in the polymer is, of course, necessary in order for the coloration process of our invention to be successfully carried out.

respectively, acidified with acetic acid so as to precipitate the various polymers from their respective lacquers. The precipitated polymers were then each, in turn, dissolved in ether and precipitated with hexane, this procedure being twice repeated. The three precipitated polymer samples were then examined with respect to their degree of color retention and the results of these observations are presented in the following table.

| No. | Precipitated Polymer Sample | Observed Color |
|---|---|---|
| 1 | Dye site containing terpolymer which had been reacted with the stabilized diazonium salt. | Original orange color almost completely retained. |
| 2 | Control polymer, lacking the dye site monomer, which had merely been admixed with the stabilized diazonium salt. | Original yellow color was completely lost. |
| 3 | Control polymer, lacking the dye site monomer, to which an orange dye had been post-added. | Original orange color was almost completely lost. |

The above results clearly indicate that our novel process results in the preparation of colored polymeric compositions in which the color is actually an integral or "built-in" component of the polymer molecule.

| Sample No. | Diazonium Salt of— | Stabilization Reagent | Parts Stab. Salt Used | Color of Control | Color of Dye Site Containing Polymer |
|---|---|---|---|---|---|
| 1 | Ortho-chloroaniline | Zinc chloride | 0.61 | Yellow | Orange. |
| 2 | 2,5-dichloroaniline | do | 0.70 | do | Yellow-orange. |
| 3 | 2-nitro-4-methylaniline | Naphthalene-1,5-disulfonic acid | 1.14 | do | Orange-red. |
| 4 | Dianisidine | Zinc chloride | 0.60 | Purple | Blue. |
| 5 | 2-methoxy-4-nitroaniline | do | 0.72 | Yellow-brown | Orange. |
| 6 | 2-anisidine-5-n-butyl sulfonamide | do | 0.98 | Orange-brown | Pink. |

Although the control samples yielded a color, it will be shown, in the following example, that this color was not an inherent part of the polymer as is the case with the colors produced with the dye site containing polymers applicable to the process of our invention.

*Example II*

The following experiment was conducted in order to show that the process of our invention actually results in the preparation of polymeric compositions wherein the color is an integral or "built-in" component of the polymer molecule.

A portion of the 83:15:2 ethyl acrylate:acrylic acid:2-hydroxy-3-(2-hydroxy-3-naphthoyloxy)propyl acrylate terpolymer lacquer, whose preparation was described in Example I, was adjusted to a pH level of 6.5–7.0 by the addition of aqueous ammonia. Ten parts of the thus treated lacquer were then colored, according to the process of our invention, by being admixed with 10 parts of a 50%, by weight, aqueous acetone solution containing 0.61 part of the zinc chloride stabilized diazonium salt of ortho-chloroaniline.

As a control for this experiment, an 85:15 ethyl acrylate:acrylic acid copolymer lacquer was similarly treated with ammonia and was then colored by being admixed with the zinc chloride stabilized diazonium salt of ortho-chloroaniline in a manner comparable to that described for the coloration of the dye site containing polymer. As an additional control experiment, we post-added a quantity of the dye derived by coupling 2-hydroxy-3-naphthoic acid with the diazonium salt of o-chloroaniline, the latter being a commercially available orange dye, to a portion of this 85:15 ethyl acrylate:acrylic acid copolymer lacquer.

The two control samples along with the sample containing the orange colored composition produced by means of the process of our invention were then each,

*Example III*

This example illustrates the manner in which the intensity or shading of the color which is produced by means of the novel polymer coloration process of our invention may be varied merely by altering the concentration of the dye site monomer which is present within the polymer.

For this purpose, we prepared four different samples of the 45:55 isopropanol:water lacquer of the ethyl acrylate: acrylic acid:2-hydroxy-3-(2 - hydroxy - 3 - naphthoyloxy) propyl acrylate terpolymer by means of the procedure given in Example I. In this case, however, each of the four samples contained varying proportions of the dye site monomer, i.e. 84.5:15:0.5; 84:15:1.0; 83:15:2; and 80:15:5. The pH of each of these polymer lacquers was then adjusted to a value of 6.5–7.0 by the addition of aqueous ammonia whereupon their coloration was effected by the addition, to each of 10 parts of a 1:1 aqueous acetone solution which contained the stoichiometric amount, with respect to the concentration of the dye site monomer in each of the various polymers, of the zinc chloride stabilized diazonium salt of 2-anisidine-5-n-butyl sulfonamide. The following table indicates the colors which were produced in each case.

Percent of dye site monomer
in the polymer:                    Color produced
  0.5 _____ Orange.
  1.0 _____ Orange-pink.
  2.0 _____ Pink.
  5.0 _____ Red.

*Example IV*

This example illustrates the application of the process of our invention to the coloration of a dye site containing polymer which was in the form of an aqueous emulsion. A 77:20:3.0 vinyl acetate:dibutyl maleate:2-hydroxy-3-

(2-hydroxyphenoxy)propyl acrylate aqueous emulsion terpolymer was prepared by charging the following ingredients into a reactor equipped with a reflux condenser as well as with means for mechanical agitation.

| | Parts |
|---|---|
| Vinyl acetate | 77.0 |
| Dibutyl maleate | 20.0 |
| 2-hydroxy-3-(2-hydroxyphenoxy)propyl acrylate | 3.0 |
| Water | 90.0 |
| Ammonium persulfate | 0.3 |
| Polyvinyl alcohol (medium viscosity grade, 88% hydrolyzed) | 3.0 |

The above mixture was then maintained at a temperature of 69° C. for a period of 4 hours resulting in an emulsion with a resin solids content of 52%, by weight. To this emulsion there was then added 100 parts of an aqueous solution containing 3.1 parts of the zinc chloride stabilized diazonium salt of ortho-chloroaniline. This mixture was then heated for 15 minutes at a temperature of 70° C. thereby effecting the reaction between the polymer and the diazonium salt which provided the former with a yellow color. Films cast from this emulsion onto various substrates, including paper, paperboard and glass, also exhibited this yellow color.

In a repetition of the above described polymer coloration process, a red color was in this case produced by substituting the zinc chloride stabilized diazonium salt of ortho-methoxyaniline for the zinc chloride stabilized diazonium salt of othro-chloroaniline which had previously been utilized.

*Example V*

This example illustrates the manner in which the novel process of our invention may be used for the coloration of dye site containing polymers which have previously been cast into films. Also illustrated is the use of diazonium salts, in situ, in the form of the aqueous solutions wherein they had been prepared.

A film having a wet thickness of 3 mils was cast from a sample of the aqueous isopropanol lacquer of the 83:15:2 ethyl acrylate:acrylic acid: 2-hydroxy-3-(2-hydroxy-3-naphthoyloxy)propyl acrylate terpolymer whose preparation was described in Example I. After drying, this film was immersed in 20.0 parts of an aqueous solution containing 1.0 part of the diazonium salt of 2-anisidine-5-n-butyl sulfonamide; this solution being the one in which the diazonium salt had initially been prepared.

The diazonium salt solution containing the film immersed therein was warmed on the steam bath for a period of 30 minutes. Upon being removed from the salt solution, the film was found to have been colored pink. In contrast, a control film which had been prepared from an aqueous isopropanol lacquer of an 85:15 ethyl acrylate:acrylic acid copolymer, which did not contain the dye site monomer, was found to have turned a brown color when treated under the same conditions.

*Example VI*

This example illustrates another technique by means of which the novel process of our invention may be used for the coloration of dye site containing polymers.

Five parts of an acetone solution containing 1.5 parts of the sodium fluoborate stabilized diazonium salt of para-nitroaniline were added to 250 parts of the aqueous isopropanol lacquer containing 40%, by weight, of resin solids of the 83:15:2 ethyl acrylate:acrylic acid: 2-hydroxy-3-(2-hydroxy-3-naphthoyloxy)propyl acrylate terpolymer whose preparation was described in Example I. As a control for this experiment, 1.5 parts of the identical diazonium salt were also added to 250 parts of an aqueous isopropanol lacquer of an 85:15 ethyl acrylate:acrylic acid copolymer which had been similarly prepared but which did not, of course, contain the dye site monomer.

Films having a wet thickness of 3 mils were cast from both the control and the dye site containing polymer lacquers. After drying, these films were exposed to ammonia vapor for a period of 5 minutes whereupon the films derived from the dye site containing polymer turned a deep orange color which did not fade on standing. In contrast, the control film turned red but, on standing, the color faded to yellow.

Although the above disclosure is seen to encompass the reaction of diazonium salts with polymers derived from ethylenically unsaturated derivatives of both ortho-hydroxy aromatic acids and ortho-dihydric phenols having either a phenyl or naphthyl nucleus, it is of course to be understood that compounds of this type having phenyl or naphthyl nuclei which have been substituted, as for example, with low molecular weight hydrocarbon groups, may also be utilized in preparing the polymers utilized in the novel process of our invention.

It should also be pointed out that although the process of our invention has been limited to the reaction of diazonium salts with polymers derived from the reaction products of orthohydroxy aromatic acids or ortho-dihydric phenols with either glycidyl acrylate or glycidyl methacrylate, it is to be noted that one may also, if desired, utilize comparable polymers which may be derived from monomers comprising the reaction products of the ortho-hydroxy aromatic acids or the ortho-dihydric phenols with such reagents as allyl glycidyl ether, butadiene monoxide, glycidyl crotonate, or the glycidyl alkyl maleates as well as any other available epoxides having ethylenically unsaturated linkages.

Summarizing, our invention is thus seen to provide the practitioner with a novel process for the preparation of colored polymeric compositions whose color is an integral, "built-in" component of the polymer molecule. Variations may be made in proportions, procedures, and materials without departing from the scope of our invention which is limited only by the following claims.

What is claimed is:

1. A method for the coloration of a polymer of at least one ethylenically unsaturated monomer together with at least about 0.1%, by weight, of an ethylenically unsaturated derivative of an ortho-hydroxy aromatic compound which corresponds to the formula:

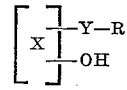

wherein Y is a radical selected from the group consistting of oxy and carboxy radicals;

wherein X is a radical of the benzene series selected from the group consisting of phenyl and naphthyl radicals having said —OH and —Y—R groups substituted thereon in positions which are ortho with respect to one another; and, wherein R is an ethylenically unsaturated radical selected from the group consisting of beta-hydroxypropyl acrylate and beta-hydroxypropyl methacrylate radicals, said method comprising reacting said polymer with at least one diazonium salt.

2. The method of claim 1, wherein said diazonium salt is in a stabilized form.

3. The method of claim 1, wherein said ethylenically unsaturated derivative of an ortho-hydroxy aromatic compound is selected from the group consisting of:

2-hydroxy-3-(2 - hydroxy - benzoyloxy)propyl acrylate and methacrylate;

2-hydroxy-3-(1-hydroxy-2 - naphthoyloxy)propyl acrylate and methacrylate;

2-hydroxy-3-(2-hydroxy-3 - naphthoyloxy)propyl acrylate and methacrylate;
2-hydroxy-3-(2-hydroxy-1 - naphthoyloxy)propyl acrylate and methacrylate;
2-hydroxy-3 - (2 - hydroxyphenoxy)propyl acrylate and methacrylate;
2-hydroxy-3-(1-hydroxy - 2-naphthoxy)propyl acrylate and methacrylate; and,
2-hydroxy-3-(2-hydroxy-3 - naphthoxy)propyl acrylate and methacrylate; and
wherein said ethylenically unsaturated monomer is selected from the group consisting of:
styrene, alpha-methyl styrene, the acrylic and methacrylic esters of aliphatic alcohols, acrylic acid, isoprene, methacrylic acid, butadiene, acrylamide, acrylonitrile, methacrylonitrile, vinyl propionate, dibutyl maleate, dibutyl fumarate, vinylidene chloride, vinyl chloride, vinyl acetate, ethylene, and propylene.

4. The method of claim 1, wherein said polymer is present in a medium selected from the group consisting of water and organic solvents.

5. The method of claim 1, wherein the pH of said polymer is adjusted to a level in the range of from about 5 to 9.

6. The method of claim 1, wherein said reaction is conducted at elevated temperatures.

7. A method in accordance with claim 3, wherein a copolymer of ethyl acrylate, acrylic acid and at least about 0.1% by weight, of 2-hydroxy-3-(2-hydroxy-3-naphthoyloxy)propyl acrylate is colored by means of a reaction with a diazonium salt of an aromatic amine selected from the group consisting of ortho-chloroaniline; 2,5-dichloroaniline; 2-nitro-4-methylaniline; dianisidine; 2-methoxy-4-nitroaniline; and, 2-anisidine-5-n-butyl sulfonamide.

8. A method in accordance with claim 3, wherein a copolymer of vinyl acetate, butyl maleate, and at least about 0.1%, by weight, of 2-hydroxy - 3 - (2 - hydroxyphenoxy)propyl acrylate is colored by means of a reaction with a diazonium salt of an aromatic amine selected from the group consisting of ortho-chloroaniline and ortho-methoxyaniline.

9. A colored polymeric composition containing at least about 0.1%, by weight, of mers which correspond to the formula:

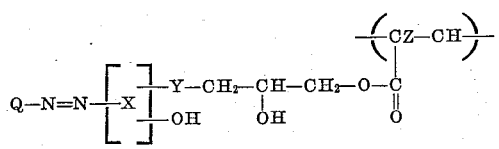

wherein Z is a radical selected from the group consisting of hydrogen and methyl radicals; wherein Y is a radical selected from among the group consisting of the oxy and carboxy radicals; wherein Q is a radical of the benzene series selected from the group consisting of the phenyl, naphthyl, and anthracyl radicals; wherein X is a radical of the benzene series selected from the group consisting of phenyl and naphthyl radicals having said —OH and

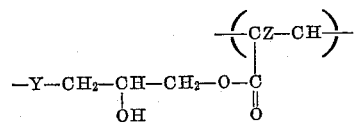

groups substituted thereon in positions which are ortho with respect to one another.

10. The colored polymeric composition of claim 9, which also contains therein mers derived from at least one ethylenically unsaturated comonomer selected from the class consisting of:
styrene, alpha-methyl styrene, the acrylic and methacrylic esters, of aliphatic alcohols, acrylic acid, isoprene, methacrylic acid, butadiene, acrylamide, acrylonitrile, methacrylonitrile, vinyl propionate, dibutyl maleate, dibutyl fumarate, vinylidene chloride, vinyl chloride, vinyl acetate, ethylene, and propylene.

References Cited

UNITED STATES PATENTS 3,011,860  12/1961  Hirschfeld et al. __ 260—78.5 XR
3,180,851  5/1965   Goldberg et al. __ 260—31.2 XR MORRIS LIEBMAN, *Primary Examiner.*

J. H. DERRINGTON, *Assistant Examiner.*